United States Patent
Zeegers et al.

(10) Patent No.: US 7,174,846 B2
(45) Date of Patent: Feb. 13, 2007

(54) METHOD AND DEVICE FOR PREPARING A LAYER OF COATING MATERIAL, AND COATING DEVICE

(75) Inventors: Johannes Gerardus Martinus Antonius Zeegers, Sambeek (NL); Jacobus Wilhelmus Willems, Siebengewald (NL); Hendricus Franciscus Jacobus Maria van der Eerden, Gemert (NL)

(73) Assignee: Stork Titan B.V. (NL)

( * ) Notice: Subject to any disclaimer, the term of this patent is extended or adjusted under 35 U.S.C. 154(b) by 100 days.

(21) Appl. No.: 10/270,235

(22) Filed: Oct. 15, 2002

(65) Prior Publication Data

US 2003/0079678 A1    May 1, 2003

(30) Foreign Application Priority Data

Oct. 31, 2001 (NL) ................................ 1019265
May 1, 2002  (NL) ................................ 1020511

(51) Int. Cl.
*B05C 19/04*  (2006.01)
*B05D 1/12*   (2006.01)

(52) U.S. Cl. .................... 118/24; 118/30; 118/308; 118/312; 99/494

(58) Field of Classification Search ................ 118/13, 118/16, 24, 30, 308, 312; 99/494, 450.1; 198/550.3, 580; 426/289
See application file for complete search history.

(56) References Cited

U.S. PATENT DOCUMENTS

| | | | |
|---|---|---|---|
| 2,358,289 A | | 9/1944 | Kendall et al. |
| 3,905,326 A | * | 9/1975 | Eisenberg ............. 118/24 |
| 4,758,778 A | * | 7/1988 | Kristinsson ........... 324/692 |
| 5,052,330 A | | 10/1991 | Stacy ..................... 118/16 |

FOREIGN PATENT DOCUMENTS

| | | |
|---|---|---|
| EP | 0 397 267 | 11/1990 |
| EP | 0 411 174 | 2/1991 |
| EP | 0 904 704 | 3/1999 |
| EP | 1 106 085 | 6/2001 |
| GB | 1 572 464 | 7/1980 |
| GB | 2 099 276 | 12/1982 |

* cited by examiner

*Primary Examiner*—Laura Edwards
(74) *Attorney, Agent, or Firm*—Blank Rome LLP

(57) ABSTRACT

In a method for forming a layer of coating material, a conveyor having a conveying part which is pervious to the coating material is used. This coating material is displaced on the conveying part over a guide plate into a coating zone. At the end of a coating zone, excess coating material is returned using a return part of a conveyor. To form a layer of coating material on the conveying part, the coating material is moved from the return part through the conveying part onto the conveying part.

48 Claims, 5 Drawing Sheets

METHOD AND DEVICE FOR PREPARING A LAYER OF COATING MATERIAL, AND COATING DEVICE

FIELD OF THE INVENTION

According to a first aspect, the invention relates to a method for forming a layer of a free-flowing coating material on the conveying part of a conveyor having a conveying part, which conveyor is pervious to the coating material, the coating material on the conveying part being displaced by the conveyor over a guide plate in a coating zone in a first direction, and excess coating material being displaced on a return part using a conveyor in an opposite direction to the first direction. The invention also relates to a device suitable for carrying out the method according to the invention, as well as to a coating device and to drum type conveyors.

BACKGROUND OF THE INVENTION

A method of this type is generally known in the art, for example from U.S. Pat. No. 5,052,330. This patent publication relates to a coating device for applying crumbing substance, which comprises fresh breadcrumbs, which are more likely to form lumps than ordinary crumbs, to food products. In one embodiment of this known device, a continuous layer is formed on the conveying part of an endless conveyor belt from coating material which is returned by the return part of the endless conveyor belt. The returned coating material drops through the conveyor belt just ahead of a reversing roll as a result of the distance between the return part of the conveyor belt and the guide plate below it being increased. At that location, the coating material accumulates in a space which is delimited by the said reversing roll, on the one hand, and a separately driven pushing roll which is arranged at a certain distance therefrom, on the other hand, and at the sides by the housing. This driven pushing roll rotates in an opposite direction to the reversing roll, so that the effect of the two means that the coating material is pushed upward through the opening between the reversing roll and the driven pushing roll, and is then entrained by the conveying part, thus forming a continuous layer.

Although it is stated in this publication that the effects of the reversing roll and/or that of the pushing roll do not cause any deterioration in the coating material, there is nevertheless still some crushing of the coating material between the rolls and the housing and between the different rolls on account of the compressive forces exerted on the coating material.

It is an object of the present invention to provide a method and device for forming a layer of this type in which crushing of this type is reduced further.

SUMMARY OF THE INVENTION

In the method of the type described in the preamble, upstream of the coating zone the coating material is transferred from the return part through the conveying part onto the conveying part. The coating material which is returned on the return part is guided in such a manner that it passes through the conveying part and is then conveyed onwards thereon in order in this way to form a layer, in most cases a continuous layer. This method of transferring the coating material from the return part to the conveying part results in less crushing, since in this case the coating material is pushed upwards by itself. The pressure on and the chaffing action of the coating material are in this way reduced compared to the abovementioned prior art, with coating material being forced between solid rolls. The fact that the conveying part and the return part move in opposite directions causes a substantially rolling movement of the coating material, and this movement leads to less damage to the coating material.

Auxiliary means are advantageously used to guide the coating material from the return part to the conveying part. By way of example, a guide plate, for example a semicircular curved plate, may be arranged just above the return part, retaining the surplus coating material supplied. The fact that excess coating material is supplied continuously results in an accumulation until the height of the coating material which has collected in this way has risen as far as the conveying part. The coating material then passes through the conveying part and is carried along thereby.

The invention also relates to a device for forming a layer of free-flowing coating material which can be used to carry out the above method. The device according to the invention comprises a conveyor which is pervious to the coating material and has a conveying part, which can move in a first direction, a return part of a conveyor, which is arranged so that it can move in substantially the opposite direction, and a guide plate for moving coating material on the conveying part using a conveyor in a coating zone. According to the invention, there is a buffer zone which is delimited by at least the return part and the conveying part, in such a manner that coating material can be transferred from the return part via the buffer zone, through the conveying part, onto the conveying part. In the device, there is a buffer zone, from which the coating material passes through the conveying part. This buffer zone is at least delimited by the return part and the conveying part. Special measures for supplying and discharging the coating material to and from the buffer zone are unnecessary, apart from an at least partial restriction of the freedom of movement of the returned coating material. This restriction is advantageously effected with the aid of auxiliary means.

According to a third aspect, the invention relates to a device for coating moving products, in particular food products, on all sides with a free-flowing coating material, in particular free-flowing coating material in particle form, such as a crumb-coating machine or a flour-coating machine, which coating machine comprises means for forming a lower bed of coating material and means for forming an upper bed of coating material. According to the invention, the means for forming a lower bed are the device discussed above for forming a layer of coating material in accordance with the invention. This coating device achieves the advantages which have been described above. In this case too, the pervious conveying part is designed to receive and convey the products which are to be and have been coated. An example of a suitable conveyor is what is known as a grille belt.

BRIEF DESCRIPTION OF THE DRAWINGS

The invention is explained below with reference to the appended drawing, in which.

DESCRIPTION OF THE PREFERRED EMBODIMENTS

Figure 1:
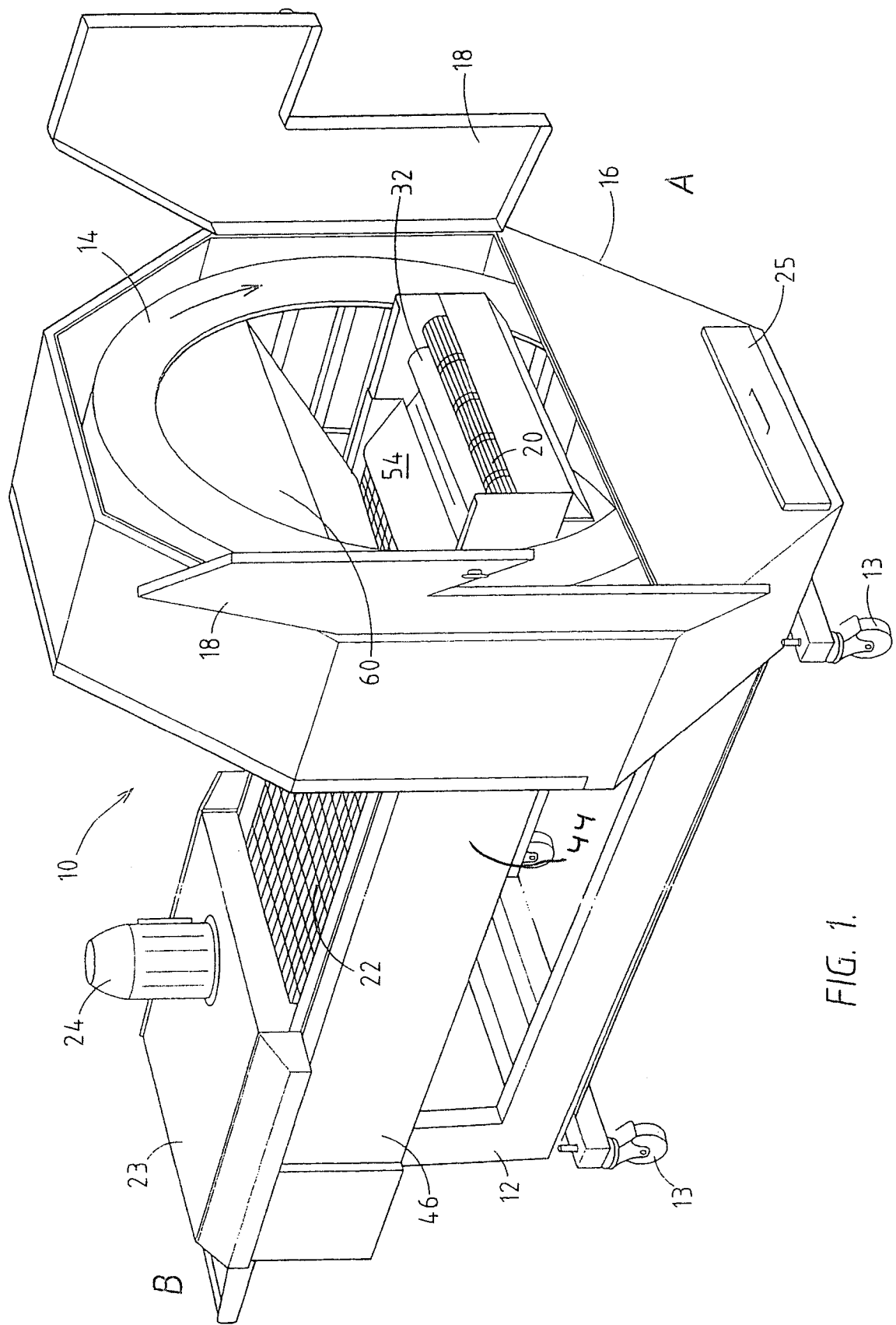
FIG. 1 shows a perspective view of an embodiment of a coating device according to the invention.

In the method and device according to the invention the conveying part and the return part may form part of separate conveying systems, and it is not necessary for the return part to be pervious to the coating material. By way of example, the conveying part may be a pervious and endless conveyor belt, while any desired conveyor system can be used to return the material. Advantageously, however, the conveying part and the return part form part of the same endless conveyor belt. If the return part is also pervious to coating material, a guide plate is arranged beneath this part. The transfer of material from the return part to the conveying part then takes place at a position upstream of a reversing roll, so that there can be no crushing of coating material between the reversing roll and the surrounding housing or guides.

In a preferred embodiment of the present method, the conveying part is guided in a movement path along the return part, leaving clear a gap. In this embodiment, the conveying part is at a certain position guided closely past the return part moving in the opposite direction, so that at this location there is relatively narrow gap (of the order of millimetres). The coating material which is being moved by the return part is retained by the conveying part, builds up and forces its way through the conveying part and is then entrained thereby. The return part and the conveying part pass one another at a short distance in order to prevent the conveyors from jamming. Furthermore, the gap has the function of at least partially limiting the displacement of the excess coating material at this position, and can be adjusted if necessary.

The method according to the invention can be used, for example, to apply particulate free-flowing coating materials, such as crumbs, flour, cornflakes and the like, to food, for example (preshaped) meat products, on which an adhesive layer of egg whites (e.g. batter) may optionally be provided. However, the method can also be used for viscous coating materials, such as pastes, sauces, etc.

It should be noted that the term "coating zone" in the present context means a section of the movement path of the conveying part from a position where coating material is placed on the conveying part to a position where coating material is removed from this part of the conveyor.

The method according to the invention is advantageously used to coat products on all sides. To this end it is advantageous for some of the coating material which is displaced by the return part to be discharged. The coating material discharged in this way can then be used to form an upper bed of coating material. This discharge may take place at any desired position, but may advantageously take place upstream of the transfer of coating material from the return part to the conveying part. Controlling the quantity of coating material which is to be discharged allows the distribution of material returned on the return part into partial streams to be influenced. This metering option is advantageous in order to allow the action of the device used, including the layer thicknesses of lower bed and upper bed, to be adjusted as desired. Another possibility is to discharge some of the coating material which is already on the conveying part, for example via an overflow over the above-mentioned guide roll.

Advantageously, the said conveying part and return part together form an endless belt, and beneath the return part there is a guide plate, as has already been explained above in connection with the method to the invention.

According to a preferred embodiment of the device according to the invention, upstream of the coating zone the conveying part describes a movement path along the return part, leaving clear a gap between the conveying part and the return part, in such a manner that coating material can be transferred from the return part through the conveying part onto the conveying part. This device according to the invention results in the advantages which have already been explained above.

It is preferable for the height of the gap between conveying part and return part to be adjustable, in order to be able to adapt as desired to the type of coating material and specific properties thereof. The gap height is usually of the order of magnitude of the mean particle size of the coating material.

According to an advantageous embodiment for forming the gap, the device comprises a reversing roll for reversing the conveyor belt from, as seen in the direction of movement, the return part to the conveying part, and a guide roll which is arranged downstream thereof and defines the gap between conveying part and return part. The return roll may be of a conventional type. The guide roll is advantageously solid, so that the coating material can only penetrate through the conveyor belt downstream of the guide roll. Making the position of the guide roll adjustable allows the gap height to be changed if necessary.

As an alternative to a guide roll, it is also possible for other guides, for example slide plates, to be used in order to bring the two parts of the conveyor belt together.

The movement path of the conveying part from the buffer zone in the device according to the invention preferably comprises an uphill section which is directed obliquely upwards. This uphill section advantageously has an upward angle, i.e. the angle between the conveying part and a horizontal plane, which lies in the range from 25–30°. An upward angle of this type is sufficient for most standard types of coating material to ensure uniform conveying of the coating material without the layer formed being adversely affected.

According to a further preferred embodiment, there is an upper plate above the conveying part of the conveyor over a part of the coating zone, which upper plate, as seen in the direction of movement of the conveyor, is arranged so as to slope slightly in the direction of the guide plate below. It has been found that during the conveying of particulate coating material on the conveying part, a certain segregation may occur in the layer which is formed as a result of, inter alia, differences in velocity over the layer thickness, friction with the guide plate below and inevitable vibrations. This segregation leads to the formation of a layer in which fine particles have settled deeper into the layer and coarser particles form the upper surface. Products which are placed on to a layer of this type are therefore coated mainly with coarse particles on the underside, resulting in a non-uniform coverage. It is assumed that this segregation is counteracted by the low frictional force exerted on the coating material by the upper plate. Adjusting the angle between the upper plate and the guide plate below it, which run towards to one another, and the distance between them makes it possible to form a layer with a desired composition and structure. More specifically, it is assumed that, at the surface of the upper plate, the velocity of the particles is lower than in the vicinity of the conveyor, so that the particles execute a rolling movement and fine particles do not sink into the layer. In this way, products can be covered on the underside with a uniform coating layer of in particular fine coating material, without any locations remaining uncovered. If the distance between guide plate and upper plate is too short, the particulate material is pressed on and a solid bed is obtained. If this distance is too great, a loose layer is obtained. When used in a coating device, the upper plate extends as far as a horizontal movement path section of the conveying part, advantageously as far as the position in which products which are to be coated are deposited on the layer which has been formed. In this way, it is possible to coat the products uniformly. At the other end, the upper plate advantageously extends a certain distance, of the order of magnitude of a few centimetres, for example 2 cm, beyond the guide plate below it.

It will be understood that this structure comprising cooperating guide plate and upper plate can also be used in other devices for forming a layer of coating material according to the prior art, for example in the device described in the US patent cited above.

The guide plate arranged beneath the return part is advantageously provided with discharge means, preferably at a position upstream of the buffer zone or at the buffer zone. When used in a coating device, these discharge means can be used to discharge a partial stream of the coating material, and this partial stream is used advantageously to form an upper layer. A discharge opening in the guide plate arranged beneath the return part or at the downstream end thereof or a suction system are examples of suitable discharge means. If desired, the discharge means may comprise separating means, such as screens or other filters, so that the partial stream of coating material discharged by the discharge means has a defined particle size. If desired, the partial stream can be divided into fractions with different particle sizes by using a plurality of distinct separation means, each with a specific passage opening e.g. size. These fractions can then be used separately or in combination as starting materials for forming one or more layers with a specific particle size or particle size distribution. It is preferable for the volume or mass of the partial stream which is to be discharged to be adjustable; for example, in the case of the discharge opening, the dimensions of this opening are adjustable. A slide which can move to and fro in the longitudinal direction of the device is a structurally simple embodiment allowing the size of the opening to be set to a desired value. Correct setting of, inter alia, this size allows a desired distribution of the coating material carried along by the return part into partial streams to form a lower bed and to form an upper bed to be achieved.

In order to be able to remove or discharge coating material from the return part in a simple way if necessary, for example in the event of jamming, the end of the guide plate which lies below the return part and close to the buffer zone is advantageously movable in the vertical direction. In a preferred embodiment, this end is resiliently mounted, so that when the pushing pressure of the coating material on the guide plate exceeds the spring pressure the guide plate automatically moves downwards and can discharge coating material, for example via an overflow to means for forming an upper bed, until the counterpressure of the spring is once again greater than the force exerted by the coating material. The other end is, for example, pivotably mounted. In another embodiment, there is a pressure sensor for measuring the pressure exerted on the guide plate, (the free end of) the guide plate being displaced or not being displaced depending on the measured pressure and comparison with a maximum admissible pressure.

Although known means are suitable for forming the upper bed in the coating device according to the third aspect, for example screw conveyors if desired in combination with endless belt systems for additional transverse or longitudinal conveying in the device, it is preferable to use a drum conveyor which is substantially at right angles to the longitudinal direction of the device, is arranged so that it can rotate about a horizontal axis, has compartments and can rotate past the bottom of the discharge opening in the guide plate for the return part.

A fourth aspect of the invention relates to a drum conveyor for conveying free-flowing coating material from a bottom filling position to a top release position, which comprises a drum which can rotate about a substantially horizontal longitudinal axis, comprising an outer wall with side walls which, as seen in the axial direction, are arranged on either side of the outer wall and extend partially inwards from the outer wall, and a number of partitions which extend between the side walls, from the outer wall inwards, in such a manner that the partitions, side walls and outer wall delimit a number of conveying compartments, which conveying compartments are at least partially open on the inner side.

A drum conveyor of this type with a cylindrical drum is known from EP-B1 0 411 174 and is used therein to form an upper bed and then a lower bed in a coating device in order to coat food products with particulate coating material on all sides. In this known coating device, the drum conveyor is arranged at right angles to the conveying direction of the products and surrounds the conveyors used to convey the food products. After the food products have been coated, excess coating material is discharged through a gap between two conveyors for the food products and passes into the conveying compartments of the drum. In this known device, there is a guide device in order to uniformly fill the compartments with the excess material over the entire axial width of the inner wall of the drum in a filling position, this material dropping through the gap between the conveyors. Rotation of the drum causes the coating material to be moved upwards to a release position, where, under the force of gravity, it drops out of the compartments onto a top conveyor which is arranged in the machine direction of the coating device and is used to convey the coating material back to the product-introduction side of the coating device. A curved, stationary baffle plate is arranged adjacent to the open inner side of the conveying compartments from approximately the filling position to the release position above the top conveyor, where the top part of the baffle plate is provided with a profile in order to distribute the coating material uniformly over the width of the top conveyor.

One of the drawbacks of this known drum conveyor is that during rotation of the drum the coating material is pushed over the stationary, curved baffle plate, which entails a certain risk of the material being crushed. In addition, on account of the shearing forces which occur, there may be some segregation of the coating material according to particle dimensions. Segregation of this type is undesirable with a view to forming a uniform coating bed.

In this aspect, it is an object of the invention to provide a drum conveyor which makes it possible to offer a homogeneous coating bed to a coating device, with the above drawbacks being reduced or eliminated.

In the drum conveyor of the type described above, according to the invention for this purpose, of at least two conveying compartments, at least one of the parts which delimit the conveying compartments are different in terms of shape and/or dimensions, in such a manner that the release positions of the conveying compartments are distributed over an arc segment of the drum conveyor. This aspect of the invention is based on the insight that the homogeneity and uniformity of the coating bed which is to be formed are enhanced if the conveying compartments are not all identical. In the drum conveyor according to the invention, therefore, there are at least two conveying compartments which differ from one another in terms of their shape or dimensions. This difference is of a nature which is such that the compartments in question have different release positions, so that the coating material is well distributed over a collection device arranged below, for example a hopper or conveyor. The differences in shape and/or dimensions of the conveying compartments can be brought about by varying the position of the partitions, their length and/or shape, but it is also possible for the outer wall and/or side walls to differ for one or more compartments. With a view to production aspects, it will be advantageous to select a cylindrical outer wall with annular side walls, with the partitions producing the differences required.

Another possible way of varying the shape and/or dimensions of the conveying compartments is to incorporate filling bodies in the conveying compartments, which have an effect on the way in which the free-flowing coating material flows. Filling bodies of this type, for example triangular bars which are positioned between the side walls, are expressly considered in the context of the present specification as further components which delimit the conveying compartments.

Advantageously, at least one of the parts which delimit the conveying compartments varies in a repeating pattern in terms of its shape and/or dimensions, for example, if there are 24 conveying compartments, there is a basic pattern of four different compartments which is repeated a total of six times.

According to a preferred embodiment, at least some of the partitions include an angle which is not equal to 0° with the radius of the drum. Varying the angle of the partitions results in the coating material being released from the different compartments at differing positions over the width of a conveyor or collection device below, for example a hopper, as discussed above and explained in more detail below. It is not necessary for each partition to adopt a different angle. The partitions are preferably arranged in a repeating pattern of at least two different angles. It is also possible for the angle of each partition to be varied in the axial direction, for example in the case of partitions which are twisted in the axial direction.

The position of the partitions in order to obtain the desired distribution over the width can be determined by tests. Another possibility in this respect is computer simulation.

According to a further preferred embodiment, the partitions have an optionally gradual transition in the inward direction. A transition of this type, for example a kink or curve, contributes to a homogenous distribution over the width. The position of the transition may vary both in the radial direction and in the axial direction.

According to another preferred embodiment, at least some of the partitions have different lengths, specifically radial length in the case of a cylindrical drum, so that the compartments have different depths.

Furthermore, it has proven advantageous for the particulate coating material to slide off in layers during its release from a conveying compartment. In such a case, the top layer slides off first, followed by the layer below, and so on. In this case, the outgoing flow takes place, as it were as an avalanche. As a result of this sliding off in layers, any segregation, for example which has occurred during the filling or rotation, is eliminated. For this purpose, the partitions are advantageously arranged in such a manner that in a release position the particulate material slopes at an angle in the range from approximately 35–40° with respect to the horizontal. A substantially flat plate, if desired with a slight transition, such as a kink or curve, is suitable as a partition for this purpose.

While the drum conveyor according to the invention is operating, the free-flowing coating material undergoes a tumbling motion, which leads to a certain degree of mixing and cancels out the effect of earlier segregation resulting from the compartments being filled at the filling position. Tumbling mixing of this type takes place arbitrarily if all the compartments differ from one another.

The compartments may vary in the axial direction as a result of the side walls being provided, for example, with a wavy configuration. Variation in the radial direction is possible by on the one hand varying the radial length of the partitions or on the other hand varying the distance from the outer wall to the horizontal axis of rotation. In the latter case, the drum is not cylindrical.

According to another embodiment of a drum conveyor of the type described above according to the invention, the partitions are secured to the cylindrical outer wall under counterpressure, in such a manner that they can pivot about a substantially horizontal axis. Since the weight of a conveying compartment which is filled with coating material will vary as a result of the filling step taking place non-uniformly, a partition will adopt any balanced position, with the result that the release will also take place at an arbitrary position. In this way, it is once again possible to create a uniform bed. The counterpressure may be supplied, for example, by a spring mechanism which pushes the partition back towards a balanced position. The abovementioned preferred embodiments of the conveying compartments can also be used in this drum conveyor.

In the abovementioned embodiments, the connecting line, generally the weld seam, between a partition and the drum wall may or may not run parallel to the centre axis of the drum. An example of a drum conveyor in which this connecting line does not run parallel to the axis of the drum is one in which the connecting line adopts a skew position. This skew position may also vary in subsequent conveying compartments. The connecting line may also adopt the form of (a part of) a helix line or other line which is not straight but rather is bent or curved.

It will be understood that such a drum conveyor according to the invention is suitable for use in coating devices according to the prior art. It is advantageously used in the coating device according to the invention as discussed above.

The compartments are preferably provided with cleaning openings, advantageously at the edge in the vicinity of the outer wall, through which used cleaning agent can flow out of the compartments. The outer wall of the drum itself is then preferably also provided with discharge means, such as one or more drain holes, through which cleaning agent which accumulates in the bottom of the drum can be discharged.

The means for forming the upper bed advantageously also comprise a storage chamber with an introduction opening which is directed towards the top release position of the drum conveyor and with a discharge opening which is directed towards the conveying part of the conveyor belt, which storage chamber is arranged between the conveying part of the conveyor belt and the drum conveyor. In a preferred embodiment, the storage chamber is provided with distributor means for distributing the coating material in the width direction of the conveyor belt below, for example at the said discharge opening. A suitable design of the compartments in the drum conveyor and setting of the rotational speed of the drum conveyor as a function of the (pouring) properties of the coating material also allows a certain degree of distribution to be achieved.

In general, the above devices according to the invention can be used to apply the abovementioned coating materials to products which are deposited continuously on a lower bed which has been formed and are then covered with an upper bed. If desired, gentle pressure may be applied to the upper bed. Excess coating material (approximately 90%) is removed from the coated food products, for example by vibration or blowing, at the end of the coating zone at a position where the guide plate of the conveying part below it ends. This coating material which has been removed is collected by the return part, which moves in the opposite direction, and is returned in order to be redistributed into partial streams in order to form the lower bed and upper bed. The coated food products are discharged and processed further, for example in a hot-air oven, baking oven, cooling device or freezer.

In the drawing FIG. 1 shows an embodiment of a coating device 10 according to the invention. This coating device 10 comprises a movable frame 12 with wheels 13. The frame 12 bears a drum conveyor 14 which is arranged in a housing 16. At the product-introduction side A, the housing 16 comprises doors 18 which provide access to the drum conveyor, for example for inspection, maintenance or repair work. This drum conveyor 14 is used to form an upper bed of particulate coating material 50, as will be explained in more detail below. The doors 18 leave clear an opening through which a conveyor belt for supplying the products which are to be coated (not shown) can extend. An endless conveyor belt 20, which is composed of bars, so that it is suitable for receiving the products which are to be coated and is pervious to coating material, comprises a conveying part 22, which moves from the product-introduction side A of the device to the product-discharge side B, and a return part (not shown in FIG. 1), which runs in the opposite direction. In the vicinity of the product-discharge side B there is a blowing device 23 with motor 24, which removes excess coating material from coated products. The drive motors of the conveyor belt 20 and the drum conveyor 14 are not shown in FIG. 1.

Figure 2:
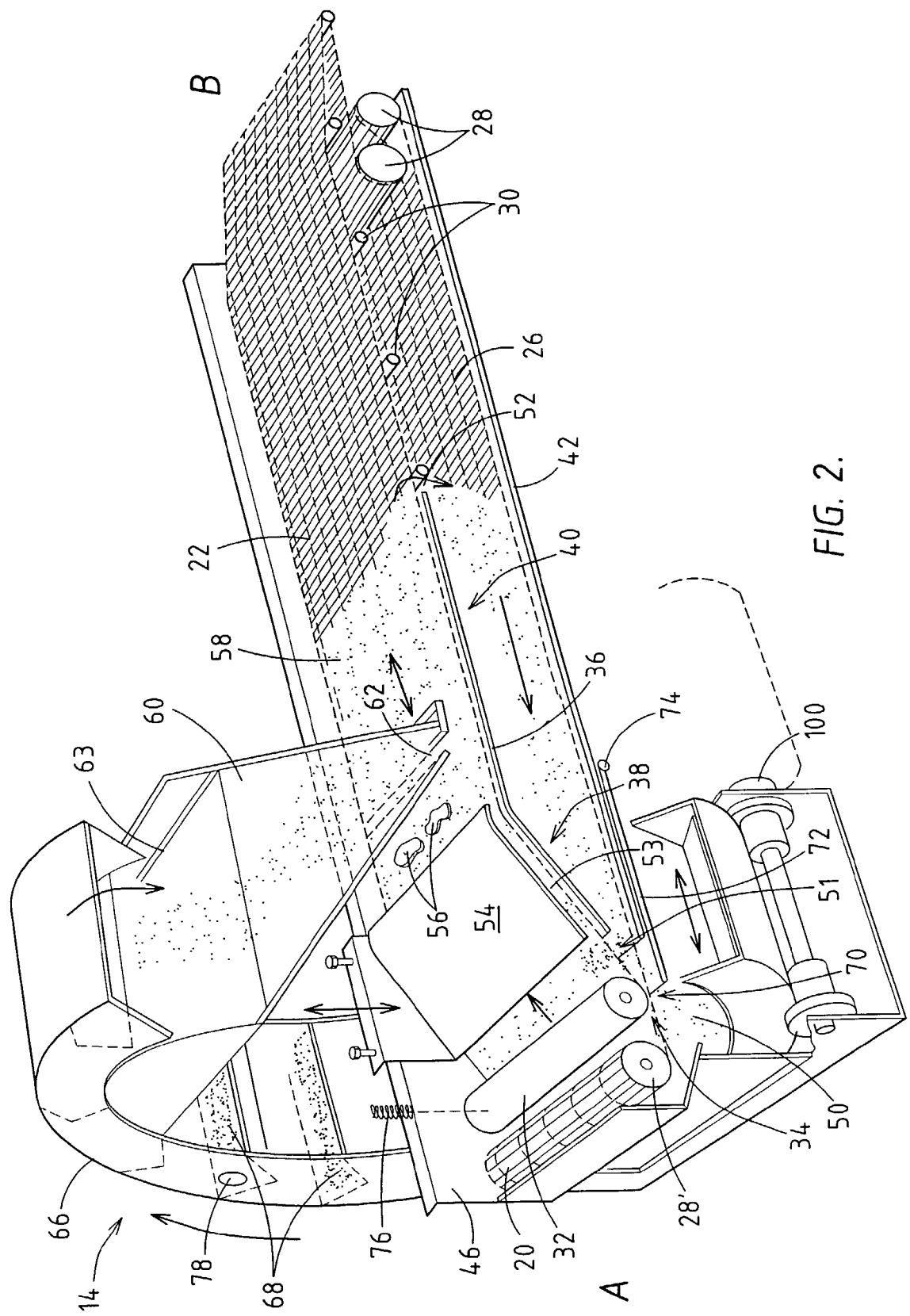
FIG. 2 shows a cut-away perspective view of a part of the coating device shown in FIG. 1.

FIG. 2 illustrates the way in which the device operates. The conveyor belt 20 with conveying part 22 and return part 26 is guided through the device 10 over (driven) reversing rolls 28 and guide rolls 30. In the vicinity of the front reversing roll 28' there is a guide roll 32 with an adjustable position. The conveying part 22 is guided along the bottom of this guide roll 32, at a short distance from the return part 26, so that there is a gap between the two parts, denoted by reference numeral 34. Downstream of this guide roll 32 there is a guide plate 36 below the conveying part 22, extending from an uphill section 38, which is directed obliquely upwards, and into a horizontal movement path 40 of the conveying part 22. The return part 26 moves just above the base 42 of a housing or receptacle 44 (cf. also FIG. 1) with vertical side walls 46, which base 42 functions as a guide plate. After products have been coated, excess coating material 50, at the end 52 of the guide plate 36, drops through the conveying part 22 onto the return part 26 and base 42, as indicated by an arrow. The return part 26 returns the coating material 50 towards the product-introduction side A. On account of the restriction to the coating material resulting from the relative positions of the return part 26 and the conveying part 22 and the opposite directions of movement thereof, the coating material accumulates, as seen in the direction of movement of the return part 26, upstream of the guide roll 32, in a buffer zone 51, and when sufficient material has accumulated, it penetrates through the conveying part 22 and is carried obliquely upwards as a continuous layer of coating material, which is also referred to as lower bed 53. In this case, the buffer zone 51 is delimited on the underside by the return part 26 and at the top side by the conveying part 22 which extends obliquely upwards, and also, in the direction of the product-introduction side A, by the guide roll 32 and that part of the conveying part 22 which is guided beneath this roll. The upward side walls 46 delimit the sides of the buffer zone 51. The layer thickness of the lower bed 53 is partially determined by the distance between the guide plate 36 and an upper plate 54 which is arranged above the conveying part 22 and in this case extends over the uphill section 38 and into the horizontal section of the conveying part 22. To prevent segregation of the layer thus formed into relatively fine and coarse particles, the distance between guide plate 36 and upper plate 54 decreases in the direction of movement, for example at the beginning this distance is 30 mm and at the end this distance is 25 mm. Downstream of the upper plate 54, the products 56 which are to be coated are deposited on the lower bed which has been formed in this way. Then, an upper bed 58 of coating material is tipped onto the products 56. In the embodiment shown, this upper bed 58 is formed from a storage chamber or hopper 60, which is provided on the underside with a funnel-shaped discharge opening 62 which extends obliquely in the direction of movement of the conveying part 22 and if desired may be provided with a pivotable or horizontally movable distribution element 64 which can also have the function of adjustable closure flap for the discharge opening 62. During operation, the hopper 60 is filled via an introduction opening 63 with coating material which is supplied with the aid of the drum conveyor 14. An additional storage container (not shown) for fresh coating material may be provided above the hopper 60 in order to top up the latter when the level in the hopper 60 falls. This is preferably carried out in a self-regulating manner without external control and actuation of valves and flaps. For example the discharge opening of the additional storage container is blocked by the coating material in the hopper 60 when the level in the hopper is high, while the discharge opening of the additional storage container is opened up when this level falls. The drum conveyor 14 comprises a driven wheel 66 with V-shaped compartments 68 which are open on the inner side. These compartments 68 are filled with a partial stream of the coating material which is returned by the return part 26. For this purpose, a discharge opening 70 is provided in base 42 upstream of the gap 34, it being possible for the size of this opening to be adjusted with the aid of a slide 72 which can be displaced in the horizontal direction. In this way, the size of the partial stream can also be adjusted. To prevent jamming, the slide 72 is secured at the upstream end to a horizontal pivot shaft 74 and at the other end to a spring structure 76, so that in the event of a maximum pressure being exceeded as a result of accumulated coating material, the slide 72 moves downwards and the material is carried with the drum conveyor 14 to the hopper 60. Any coating material which may have been spilled can be collected in a drawer 25 (cf. FIG. 1) which extends below the drum conveyor 14. With a view to ease of cleaning, there are one or more cleaning openings 78 in the outer edge—as seen in the radial direction—of a plate which forms the compartment 66.

FIG. 3 shows all this again, in a side view. The position of the upper plate 54 with respect to the guide plate 36 can be adjusted with the aid of setscrews 80.

Figure 3:
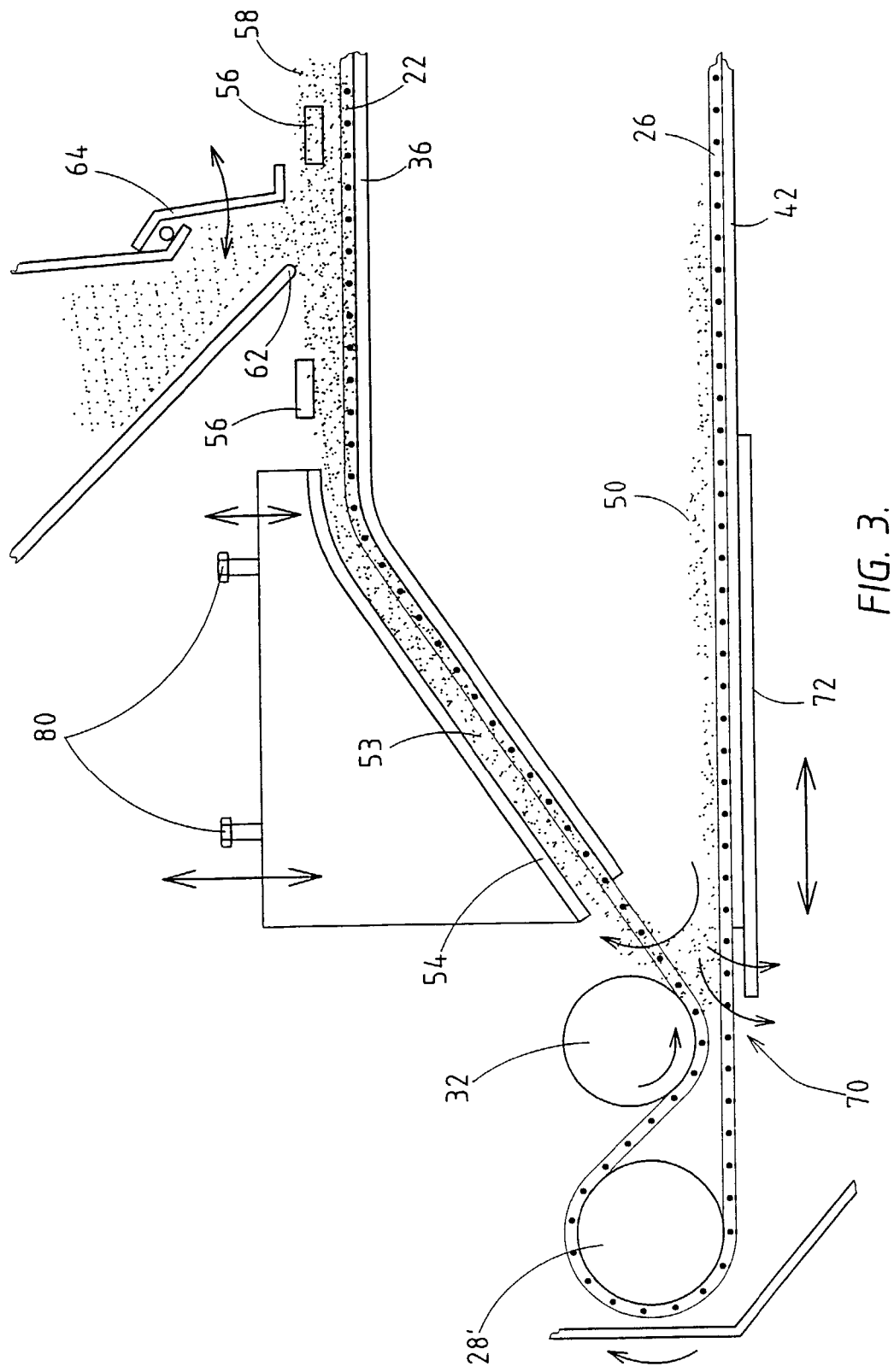
FIG. 3 shows a side view of part of the coating device shown in FIG. 1.
Figure 4:
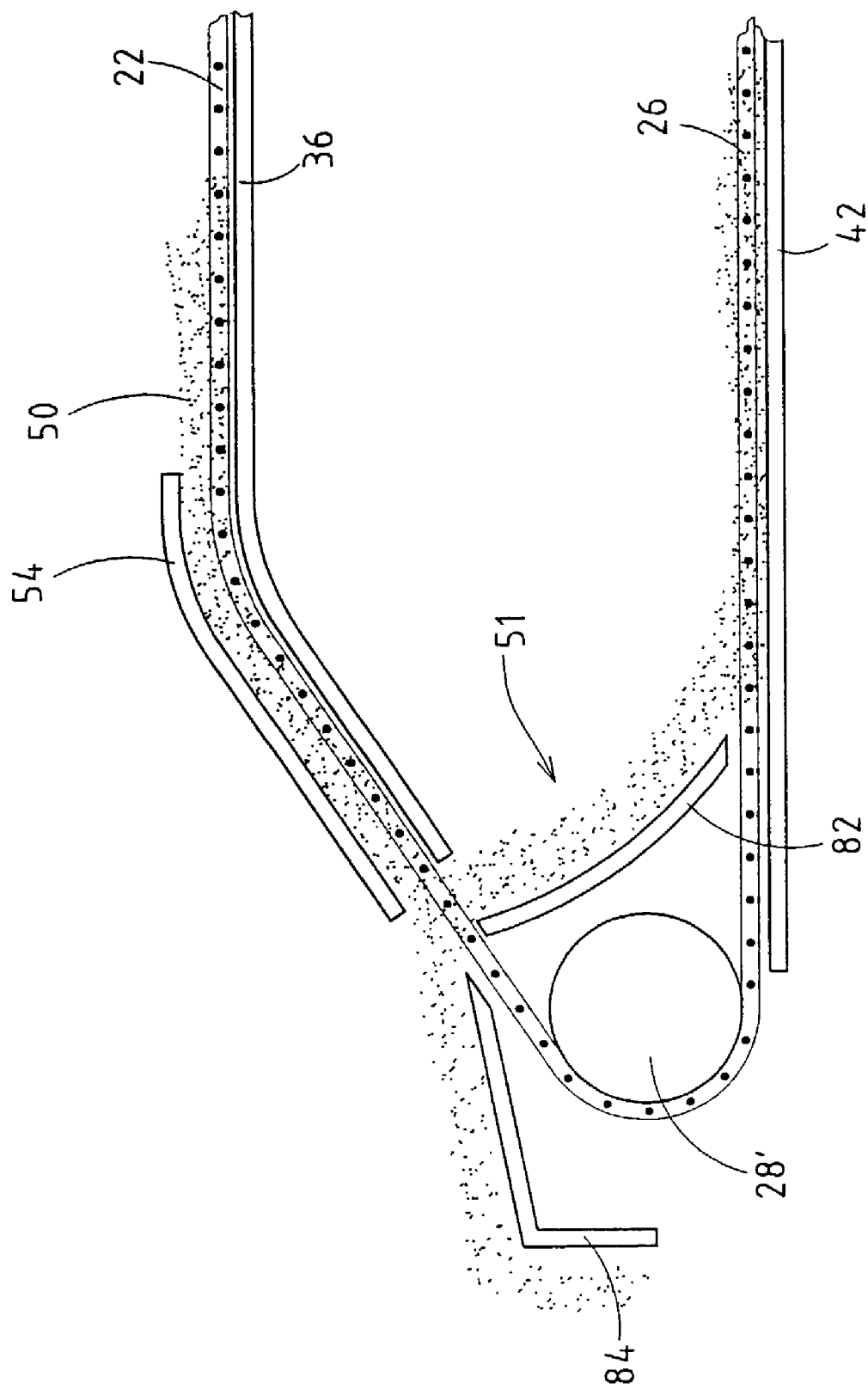
FIG. 4 shows a side view of part of a different embodiment of a coating device according to the invention.

FIG. 4 shows another embodiment of a coating device according to the invention, in which components which correspond to those shown in FIGS. 1–3 are denoted by identical reference numerals. In this embodiment, the coating material 50 which moves in the direction of the product-introduction side A is blocked by a guide plate 82 which is curved upwards, with the result that coating material accumulates in buffer zone 51. When sufficient amounts of new coating material are supplied, it pushes coating material which is already in the buffer zone 51 further upwards along the guide plate 82 and through the conveying part 22, which is pervious to coating material. There, the coating material is divided into two partial streams, namely one which is used to form the lower bed of coating material on the conveying part 22 and one which is removed via overflow 84 in order to form an upper bed after products have been placed onto the lower bed.

Figure 5:
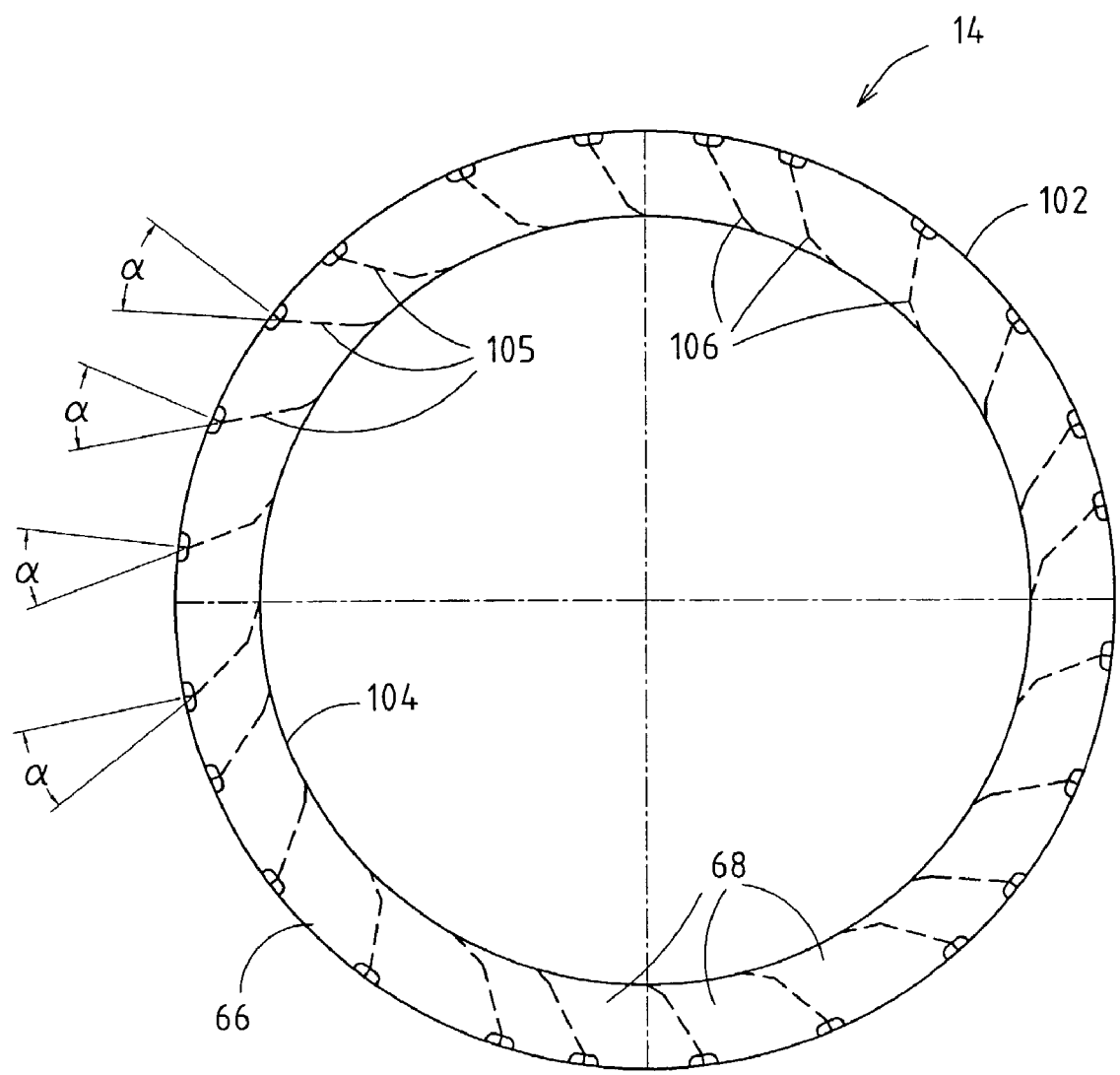
FIG. 5 shows a cross section through an embodiment of a drum conveyor according to the invention.

FIG. 5 shows a cross section through an embodiment of a drum conveyor according to the invention. The other conveyors and/or collection devices are not shown, for the sake of clarity.

The drum conveyor 14 comprises a driven drum or wheel 66, for example via the drive 100 as shown in FIG. 2, which engages on the outer circumference of the drum 66. The drum 66 comprises a cylindrical outer wall 102 with annular side walls 104 which are substantially perpendicular thereto and extend a certain distance inwards in the radial direction from the outer wall 102. Partitions 105 are distributed over the circumference of the drum 66, so that conveying compartments 68 are formed. The conveying compartments 68 are open on the inner side. As is clearly apparent from the cross section shown in FIG. 5, the partitions 105 are arranged in repeating series of four partitions, each partition within a series of this type adopting a different angle a with respect to the radius of the drum. Furthermore, the partitions 105 have a small kink 106, with the result that the inner end of a partition extends in the direction of rotation of the drum (indicated by an arrow). In the embodiment shown, the free ends of the partitions 105 lie on a circle which is concentric with respect to the outer wall of the drum conveyor.

What is claimed is:

1. Device for forming a layer of free-flowing coating material, which device has a conveyor which is pervious to the coating material and has a conveying part which can be moved in a first direction, a return part of a conveyor, which is arranged so that it can move substantially in the opposite direction, a guide plate arranged beneath the conveying part, for displacing coating material on the conveying part in a coating zone using a conveyor, wherein there is a buffer zone which is delimited by at least the return part and the conveying part, in such a manner that coating material from the return part is collected on the return part in the buffer zone until the height of the coating material has risen as far as the conveying part, and passes through the conveying part onto the conveying part.

2. Device according to claim 1, wherein there are auxiliary means for guiding coating material from the return part via the buffer zone to the conveying part.

3. Device according to claim 1, wherein the conveying part and the return part together form an endless belt, and a guide plate is arranged beneath the return part.

4. Device according to claim 3, wherein the guide plate arranged beneath the return part is provided with discharge means.

5. Device according to claim 1, wherein upstream of the coating zone the conveying part describes a movement path along the return part, leaving clear a gap.

6. Device according to claim 5, wherein the height of the gap between conveying part and return part is adjustable.

7. Device according to claim 5, wherein the conveying part and the return part together form an endless conveyor belt, and wherein the device comprises a reversing roll for reversing the conveyor belt, and a guide roll, which is arranged downstream of the reversing roll and defines the gap between conveying part and return part.

8. Device according to claim 1, wherein the conveying part comprises a movement path from the buffer zone comprising an uphill section which is directed obliquely upwards.

9. Device according to claim 7, wherein the uphill section has an upward angle in the range from 25–30°.

10. Device for forming a layer of free-flowing coating material, which device has a conveyor which is pervious to the coating material and has a conveying part which can be moved in a first direction, a return part of a conveyor, which is arranged so that it can move substantially in the opposite direction, a guide plate arranged beneath the conveying part, for displacing coating material on the conveying part in a coating zone using a conveyor, wherein there is a buffer zone which is delimited by at least the return part and the conveying part, in such a manner that coating material from the return part is collected in the buffer zone until the height of the coating material has risen as far as the conveying part, and passes through the conveying part onto the conveying part, wherein there is an upper plate above the conveying part of the conveyor over part of the coating zone, which in the direction of movement of the conveyor is arranged so as to slope slightly in the direction of the guide plate below.

11. Device for forming a layer of free-flowing coating material, which device has a conveyor which is pervious to the coating material and has a conveying part which can be moved in a first direction, a return part of a conveyor, which is arranged so that it can move substantially in the opposite direction, a guide plate arranged beneath the conveying part, for displacing coating material on the conveying part in a coating zone using a conveyor, wherein there is a buffer zone which is delimited by at least the return part and the conveying part, in such a manner that coating material from the return part is collected in the buffer zone until the height of the coating material has risen as far as the conveying part, and passes through the conveying part onto the conveying part, wherein the conveying part and the return part together form an endless belt, and a guide plate is arranged beneath the return part, wherein that end of the guide plate arranged beneath the return part which lies in the vicinity of the buffer zone can move in the vertical direction.

12. A device for forming a layer of free-flowing coating material, which device has a conveyor which is pervious to the coating material and has a conveying part which can be moved in a first direction, a return part of a conveyor, which is arranged so that it can move substantially in the opposite direction, a guide plate arranged beneath the conveying part, for displacing coating material on the conveying part in a coating zone using a conveyor, wherein there is a buffer zone which is delimited by at least the return part and the conveying part, in such a manner that coating material can be transferred from the return part via the buffer zone, through the conveying part, onto the conveying part, wherein the conveying part and the return part together form an endless belt, and a guide plate is arranged beneath the return part, and wherein that end of the guide plate arranged beneath the return part which lies in the vicinity of the buffer zone can move in the vertical direction and wherein the end is mounted resiliently.

13. Coating device for coating moving products on all sides with a free-flowing coating material, which coating device comprises means for forming a lower bed of coating material and means for forming an upper bed of coating material, wherein the means for forming a lower bed of coating material is a device according to claim 1.

14. Device according to claim 13, wherein a guide plate arranged beneath the return part is provided with discharge means, and wherein the means for forming the upper bed comprise a drum conveyor which is substantially at right angles to the longitudinal direction of the device, can rotate about a horizontal axis, has compartments and can rotate past the discharge means of the guide plate for the return part.

15. Device according to claim 14, wherein the compartments are provided with cleaning openings.

16. Coating device according to claim 13, wherein the device for forming a lower bed of coating material is a device according to claim 2.

17. A coating device for coating moving products on all sides with a free-flowing coating material, which coating device comprises means for forming a lower bed of coating material and means for forming an upper bed of coating material, wherein the means for forming a lower bed of coating material is a device for forming a layer of free-flowing coating material, which device has a conveyor which is pervious to the coating material and has a conveying part which can be moved in a first direction, a return part of a conveyor, which is arranged so that it can move substantially in the opposite direction, a guide plate arranged beneath the conveying part, for displacing coating material on the conveying part in a coating zone using a conveyor, wherein there is a buffer zone which is delimited by at least the return part and the conveying part, in such a manner that coating material can be transferred from the return part via the buffer zone, through the conveying part, onto the conveying part, wherein a guide plate arranged beneath the return part is provided with discharge means, and wherein the means for forming the upper bed comprise a drum conveyor which is substantially at right angles to the longitudinal direction of the device, can rotate about a horizontal axis, has compartments and can rotate past the discharge means of the guide plate for the return part, and wherein above the conveying part of the conveyor there is a storage chamber with an introduction opening which is directed towards the drum conveyor and with a discharge opening which is directed towards the conveying part of the conveyor.

18. Device according to claim 17, wherein the storage chamber is provided with a distributor device for distributing free-flowing coating material in the width direction of the conveyor below it.

19. Coating device for coating moving products on all sides with a free-flowing coating material, which coating device comprises means for forming a lower bed of coating material and means for forming an upper bed of coating material, wherein the means for forming a lower bed of coating material is a device for forming a layer of free-flowing coating material, which device has a conveyor which is pervious to the coating material and has a conveying part which can be moved in a first direction, a return part of a conveyor, which is arranged so that it can move substantially in the opposite direction, a guide plate arranged beneath the conveying part, for displacing coating material on the conveying part in a coating zone using a conveyor, the guide plate having a downstream end defining a discharge position for allowing coating material to pass through the conveying part, wherein there is a buffer zone which is delimited by at least the return part and the conveying part, in such a manner that coating material can be transferred from the return part via the buffer zone, through the conveying part, onto the conveying part, wherein the means for forming the upper bed comprise a drum conveyor for conveying free-flowing coating material from a bottom filling position at the discharge position of the means for forming a lower bed of coating material to a top release position situated above the conveyor, which comprises a drum which can rotate about a substantially horizontal longitudinal axis, comprising an outer wall with side walls which, as seen in the axial direction, are arranged on either side of the outer wall and extend partially inwards from the outer wall, and a number of partitions which extend between the side walls, from the outer wall inwards, in such a manner that the partitions, side walls and outer wall delimit a number of conveying compartments, which conveying compartments are at least partially open on an inner side, and which conveying compartments have release positions for releasing coating material contained in the conveying compartments together defining the top release position of the drum conveyor wherein of at least two conveying compartments, at least one of the parts which delimit the conveying compartments are different in terms of shape and/or dimensions, in such a manner that the release positions of the conveying compartments are distributed over an arc segment of the drum conveyor.

20. Device according to claim 19, wherein at least one of the parts which delimit the conveying compartments varies in a repeating pattern in terms of its shape and/or dimensions.

21. Device according to claim 19, wherein some of the partitions include an angle which is not equal to 0° with the radius of the outer wall.

22. Device according to claim 21, wherein the partitions are arranged in a repeating pattern of at least two different angles.

23. Device according to claim 19, wherein the partitions have a transition in the inward direction.

24. Device according to claim 23, wherein the position of the transition vanes.

25. Device according to claim 19, wherein at least some of the partitions have different lengths.

26. Device according to claim 19, wherein the partitions are arranged in such a manner that, in the release position, the particulate material is a sloping at an angle in the range from approximately 30–40° with respect to the horizontal.

27. Coating device for coating moving products on all sides with a free-flowing coating material, which coating device comprises means for forming a lower bed of coating material and means for forming an upper bed of coating material, wherein the means for forming a lower bed of coating material is a device for forming a layer of free-flowing coating material, which device has a conveyor which is pervious to the coating material and has a conveying part which can be moved in a first direction, a return part of a conveyor, which is arranged so that it can move substantially in the opposite direction, a guide plate arranged beneath the conveying part, for displacing coating material on the conveying part in a coating zone using a conveyor, wherein there is a buffer zone which is delimited by at least the return part and the conveying part, in such a manner that coating material can be transferred from the return part via the buffer zone, through the conveying part, onto the conveying part, wherein the means for forming the upper bed comprise a drum conveyor for conveying free-flowing coating material from a bottom filling position at the discharge position of the means for forming a lower bed of coating material to a top release position situated above the conveyor, which comprises a drum which can rotate about a substantially horizontal longitudinal axis, comprising an outer wall with side walls which, as seen in the axial direction, are arranged on either side of the outer wall and extend partially inwards from the outer wall, and a number of partitions which extend between the side walls, from the outer wall inwards, in such a manner that the partitions, side walls and outer wall delimit a number of conveying compartments, which conveying compartments are at least partially open on an inner side, wherein the partitions are secured to the outer wall under counterpressure in such a manner that they can pivot about a substantially horizontal axis.

28. Device according to claim 27, wherein the partitions are arranged in such a manner that, in the release position, the particulate material is sloping at an angle in the range from approximately 35–40° with respect to the horizontal.

29. Device for forming a layer of free-flowing coating material, which device has a conveyor which is pervious to the coating material, has a conveying part which can be moved in a first direction, a return part of a conveyor, which is arranged so that it can move substantially in the opposite direction, a guide plate arranged beneath the conveying part, for displacing coating material on the conveying part in a coating zone using a conveyor, wherein there is a buffer zone which is delimited by at least the return part and the conveying part, and auxiliary means for guiding coating material from the return part via the buffer zone, through the conveying part, onto the conveying part, the device furthermore comprising a reversing roll for reversing the return part, and a guide roll, which is arranged downstream of the reversing roll, wherein upstream of the coating zone the conveying part describes a movement path along the return part, leaving clear a gap between conveying part and return part.

30. Device according to claim 29, wherein the height of the gap between conveying part and return part is adjustable.

31. Device according to claim 29, wherein the movement path of the conveying part from the buffer zone comprises an uphill section which is directed obliquely upwards.

32. Device according to claim 31, wherein the uphill section has an upward angle in the range from 25–30°.

33. Device according to claim 29, wherein there is an upper plate above the conveying part of the conveyor over part of the coating zone, which in the direction of movement of the conveyor is arranged so as to slope slightly in the direction of the guide plate below.

34. Device according to claim 29, wherein the guide plate arranged beneath the return part is provided with discharge means.

35. Device according to claim 29, wherein that end of the guide plate arranged beneath the return part which lies in the vicinity of the buffer zone can move in the vertical direction.

36. Device according to claim 35, wherein the end is mounted resiliently.

37. Device for forming a layer of free-flowing coating material, which device has an endless conveyor belt which is pervious to the coating material, has a conveying part which can be moved in a first direction and a return part, which is arranged so that it can move substantially in the opposite direction, a guide plate arranged beneath the conveying part, for displacing coating material on the conveying part in a coating zone using a conveyor, and a guide plate below the return part, wherein there is a buffer zone which is delimited by at least the return part and the conveying part, and auxiliary means for guiding coating material from the return part via the buffer zone, through the conveying part, onto the conveying part, the device furthermore comprising a reversing roll for reversing the conveyor belt, and a guide roll, which is arranged downstream of the reversing roll, wherein upstream of the coating zone the conveying part describes a movement path along the return part, leaving clear a gap between conveying part and return part.

38. Coating device for coating moving products on all sides with a free-flowing material, which coating device comprises means for forming a lower bed of coating material and means for forming an upper bed, wherein the means for forming a lower bed of coating material is a device for forming a layer of free-flowing coating material, which device has a conveyor which is pervious to the coating material and has a conveying part which can be moved in a first direction, a return part of a conveyor, which is arranged so that it can move substantially in the opposite direction, a guide plate arranged beneath the conveying part, for displacing coating material on the conveying part in a coating zone using a conveyor, the guide plate having a downstream end defining a discharge position for allowing coating material to pass through the conveying part, wherein there is a buffer zone which is delimited by at least the return part and the conveying part, in such a manner that coating material can be transferred from the return part via the buffer zone, through the conveying part, onto the conveying part, and wherein the means for forming the upper bed comprise a drum conveyor for conveying free-flowing coating material from a bottom filling position at the discharge position of the means for forming a lower bed of coating material to a top release position situated above the conveyor, which comprises a drum which can rotate about a substantially horizontal longitudinal axis, comprising an outer wall with side walls which, as seen in the axial direction, are arranged on either side of the outer wall and extend partially inwards from the outer wall, and a number of partitions which extend between the side walls, from the outer wall inwards, in such a manner that the partitions, side walls and outer wall delimit a number of conveying compartments, which conveying compartments are at least partially open on an inner side, and which conveying compartments have release positions for releasing coating material contained in the conveying compartments together defining the top release position of the drum conveyor wherein of at least two conveying compartments, at least one of the parts which delimit the conveying compartments are different in terms of shape and/or dimensions, in such a manner that the release positions of the conveying compartments are distributed over an arc segment of the drum conveyor.

39. Device according to claim 38, wherein at least one of the parts which delimit the conveying compartments varies in a repeating pattern in terms of its shape and/or dimensions.

40. Device according to claim 38, wherein some of the partitions include an angle which is not equal to 0° with the radius of the outer wall.

41. Device according to claim 38, wherein the partitions are arranged in a repeating pattern of at least two different angles.

42. Device according to claim 38, wherein the partitions have a transition in the inward direction.

43. Device according to claim 38, wherein the position of the transition varies.

44. Device according to claim 38, wherein at least some of the partitions have different lengths.

45. Coating device for coating moving products on all sides with a free-flowing material, which coating device comprises means for forming a lower bed of coating material and means for forming an upper bed, wherein the means for forming a lower bed of coating material is a device for forming a layer of free-flowing coating material, which device has a conveyor which is pervious to the coating material and has a conveying part which can be moved in a first direction, a return part of a conveyor, which is arranged so that it can move substantially in the opposite direction, a guide plate arranged beneath the conveying part, for displacing coating material on the conveying part in a coating zone using a conveyor, the guide plate having a downstream end defining a discharge position for allowing coating material to pass through the conveying part, wherein there is a buffer zone which is delimited by at least the return part and the conveying part, in such a manner that coating material can be transferred from the return part via the buffer zone, through the conveying part, onto the conveying part, and wherein the means for forming the upper bed comprise a drum conveyor for conveying free-flowing coating material from a bottom filling position at the discharge position of the means for forming a lower bed of coating material to a top release position situated above the conveyor, which comprises a drum which can rotate about a substantially horizontal longitudinal axis, comprising an outer wall with side walls which, as seen in the axial direction, are arranged on either side of the outer wall and extend partially inwards from the outer wall, and a number of partitions which extend between the side walls, from the outer wall inwards, in such a manner that the partitions, side walls and outer wall delimit a number of conveying compartments, which conveying compartments are at least partially open on an inner side, as seen in the radial direction, wherein the partitions are secured to the outer wall under counterpressure in such a manner that they can pivot about a substantially horizontal axis.

46. Device for forming a layer of free-flowing coating material, which device has a conveyor which is pervious to the coating material and has a conveying part which can be moved in a first direction, a return part of a conveyor, which is arranged so that it can move substantially in the opposite direction, a guide plate arranged beneath the conveying part, for displacing coating material on the conveying part in a coating zone using a conveyor, wherein there is a buffer zone which is delimited upstream of a reversing roll by at least the return part and the conveying part, in such a manner that coating material from the return part is collected on the return part in the buffer zone until the height of the coating material has risen as far as the conveying part, and passes through the conveying part onto the conveying part.

47. Device for forming a layer of free-flowing coating material, which device has a conveyor which is pervious to the coating material and has a conveying part which can be moved in a first direction, a return part of a conveyor, which is arranged so that it can move substantially in the opposite direction, a guide plate arranged beneath the conveying part, for displacing coating material on the conveying part in a coating zone using a conveyor, wherein there is a buffer zone which is delimited by at least the return part and the conveying part, restricting the freedom of movement of the returned coating material, in such a manner that coating material from the return part is collected on the return part in the buffer zone until the height of the coating material has risen as far as the conveying part, and passes through the conveying part onto the conveying part.

48. Device for forming a layer of free-flowing coating material, which device has a conveyor which is pervious to the coating material and has a conveying part which can be moved in a first direction, a return part of a conveyor, which is arranged so that it can move substantially in the opposite direction, a guide plate arranged beneath the conveying part, for displacing coating material on the conveying part in a coating zone using a conveyor, wherein there is a buffer zone which is delimited by at least the return part and the conveying parts these parts being arranged next to one another leaving free a gap there between, in such a manner that coating material from the return part is collected on the return part in the buffer zone until the height of the coating material has risen as far as the conveying part, and passes through the conveying part onto the conveying part.

* * * * *